United States Patent
Kaste et al.

(10) Patent No.: US 12,421,403 B2
(45) Date of Patent: Sep. 23, 2025

(54) COATING MATERIAL FOR A LIGHTNING-PRONE OBJECT

(71) Applicant: Airbus Operations GmbH, Hamburg (DE)

(72) Inventors: Michael Kaste, Hamburg (DE); Lutz Weber, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 361 days.

(21) Appl. No.: 17/550,865

(22) Filed: Dec. 14, 2021

(65) Prior Publication Data

US 2022/0186051 A1  Jun. 16, 2022

(30) Foreign Application Priority Data

Dec. 16, 2020 (DE) .................. 102020133857.0

(51) Int. Cl.
*C09D 7/40* (2018.01)
*B05D 5/12* (2006.01)
*B64D 45/02* (2006.01)
*C09D 5/24* (2006.01)
*C09D 7/61* (2018.01)
*H01B 1/02* (2006.01)

(52) U.S. Cl.
CPC ............ C09D 7/70 (2018.01); B64D 45/02 (2013.01); C09D 5/24 (2013.01); C09D 7/61 (2018.01); H01B 1/02 (2013.01); *B05D 5/12* (2013.01)

(58) Field of Classification Search
CPC .......... B05D 5/12; B64D 45/02; C03C 12/00; C03C 17/09; C08K 7/28; C08K 9/02; C09D 5/24; H01B 1/00; H01B 1/02

USPC .... 428/121, 36.1, 293.4, 375, 378; 427/181, 427/202, 203
See application file for complete search history.

(56) References Cited

U.S. PATENT DOCUMENTS

| | | | |
|---|---|---|---|
| 4,303,431 A * | 12/1981 | Torobin ............... | C03C 11/002 425/7 |
| 8,980,771 B2 | 3/2015 | Cawse et al. | |
| 10,214,818 B2 | 2/2019 | Codolar et al. | |
| 2013/0178582 A1 * | 7/2013 | Krause ............... | C08G 18/4837 524/590 |
| 2019/0382129 A1 | 12/2019 | Weber | |
| 2021/0214511 A1 * | 7/2021 | Teranishi .............. | C08J 5/249 |

FOREIGN PATENT DOCUMENTS

| | | | |
|---|---|---|---|
| CN | 1583894 | * | 2/2005 |
| CN | 103158306 | * | 6/2013 |
| DE | 102016214651 A1 | | 1/2018 |
| DE | 102018114356 A1 | | 12/2019 |
| KR | 20200073695 | * | 6/2020 |
| WO | 2014033237 A1 | | 3/2014 |

OTHER PUBLICATIONS

Bekir et al., Glass Microspheres, El-Cezeri Journal of Science and Engineering, vol. 6, No. 3, 2019 (613-641) Jun. 25, 2019.*
German Search Report; priority document.

* cited by examiner

*Primary Examiner* — Camie S Thompson
(74) *Attorney, Agent, or Firm* — Greer, Burns & Crain, Ltd.

(57) ABSTRACT

A coating material for a lightning-prone object includes a base color substance and an additive admixed with the base color substance. The additive comprises rigid hollow beads filled with an inert gas. At least a portion of the hollow beads have an electrically conductive coating.

15 Claims, 1 Drawing Sheet

COATING MATERIAL FOR A LIGHTNING-PRONE OBJECT

CROSS-REFERENCES TO RELATED APPLICATIONS

This application claims the benefit of the German patent application No. 102020133857.0 filed on Dec. 16, 2020, the entire disclosures of which are incorporated herein by way of reference.

FIELD OF THE INVENTION

The invention relates to a coating material for a lightning-prone object, to a method for coating a lightning-prone object, and to an aircraft having a coating composed of such coating material.

BACKGROUND OF THE INVENTION

Conventional lightning protection for objects exposed to the weather and composed, for example, of a carbon fiber-reinforced plastic, often involves the introduction of an additional, conductive layer for the purpose of preventing damage to the fiber composite material. This conductive layer might comprise, for example, a metallic mesh or an expanded metal foil. Such layers, however, may affect the design of the object, its production and maintenance, with a consequent likelihood of ongoing costs not only at production but also during use of the object.

A further likelihood in the case of known layers is that of locally heated areas or breaks being formed in the layer when struck by lightning, these areas or breaks requiring location and restoration.

DE 10 2018 114 356 A1 shows an aircraft having a surface structure which includes a lightning protection facility, and which comprises a plurality of electrically conductive elements which are disposed at least as one group of elements in the surface structure. The electrically conductive elements belonging to a group, at least in sections, are disposed parallel to one another and, relative to one another, at least in two regions have different distances from one another. The conductive elements may comprise a metallic material, conductively coated plastic or electrically conductive fibers.

SUMMARY OF THE INVENTION

It is an object of the invention to propose a coating material for a lightning-prone object that minimizes mechanical damage to a structure of the object and that very largely prevents excessive heating.

A coating material for a lightning-prone object is proposed, comprising a base color substance and an additive admixed with the base color substance, wherein the additive comprises rigid hollow beads filled with an inert gas, and wherein at least a portion of the hollow beads have an electrically conductive coating.

Proposed accordingly is a coating material which can be applied like a varnish or a paint to the object in question in order to provide it with mechanical protection customary for a varnish or a paint. The coating material of the invention is additionally intended to realize lightning protection. The coating material, for application to the object in question, might be configured such that it is liquid or paste-like or can be brought into a liquid or paste-like form. In this condition, the hollow beads ought to be present very uniformly in the base color substance, in order to permit uniform application to the object in question. During a drying or curing procedure, the hollow beads ought to remain very largely in their uniform distribution by virtue of appropriate properties on the part of the base color substance.

Initially intended is a base color substance which endows the object with its desired mechanical and optical properties. The base color substance might correspond to a paint customarily used for the specific object. It is possible to conceive of the base color substance being intended for application to a primer. The base color substance preferably comprises color particles and a suitable carrier material. The base color substance might correspond, for example, to a one-component paint system, with the coating material thus representing the outermost layer of the object in question. It would also be conceivable, however, for the coating material to be covered by a further layer, for example a clearcoat, and the invention is not confined to one of the two variants. The base color system might comprise any desired surface-coating system.

In order to achieve the desired lightning protection, the additive is added to the base color substance. This additive comprises rigid hollow beads filled with an inert gas. The hollow beads are preferably implemented such that they have very little flexibility or elasticity, such that they have substantially no effect on the mechanical properties of the base color substance. The aim is for the rigid hollow beads to be distributed with a desired concentration in the base color substance and not to adversely affect the mechanical properties of the base color substance.

Since at least a portion, or all, of the hollow beads comprise an electrically conductive coating, a very strong current may briefly flow through them in the case of a lightning event. This causes a sudden increase in the temperature of the electrical coating and, consequently, of the hollow beads affected. The hollow beads are preferably designed to burst in the event of such electrical exposure, and so to expel the heated inert gas. Where a plurality of hollow beads, especially adjacent hollow beads, are destroyed in this way under lightning strike, therefore, a quantity of inert gas, determined by the number of hollow beads, is discharged in the vicinity of the strike site. This discharge can disrupt the flash channel which ensues on lightning strike, by cooling and repulsion of the incipient plasma channel The residence time of the flash channel directly on the surface of the structure under protection is consequently too short for any structural damage to be caused.

The coating material of the invention, therefore, is a very advantageous facility for preventing or alleviating structural damage to a lightning-prone object. There is no need for the design of the object in question to be altered. The layer thickness of a metallic material situated beneath the coating material for the diversion of lightning strikes can be reduced.

In addition, ESD protection, i.e., protection from electrostatic discharge, and electromagnetic shielding in the case of non-conducting materials (e.g., GFRP), can be controlled through the coating material of the invention via the concentration of the electrically conductive hollow beads.

Furthermore, the consumption of paint or varnish is reduced, resulting in a lower weight for the object in question. This is especially useful in respect of the application of the coating material for aircraft. Subsequent to a lightning strike, in the simplest case, it would be possible, after appropriate inspection of the structure, for the coating to be restored for repair.

The volume proportion of the hollow beads in the coating material is dependent on the desired application. It may vary for lightning protection, for ESD protection or for electromagnetic shielding. It ought to be determined in each case in consideration of the coated object and the desired layer thickness. It is conceivable for this purpose for calculations, practical trials and/or simulations to be used for this purpose.

In one preferred embodiment the hollow beads are subject to pressure. This means that the inert gas is present in the hollow beads with a certain pressure and, in the event of destruction of the hollow beads, the sudden outflowing is additionally assisted and a short-term gas flow begins that points away from the structure in question. In the case of use on an aircraft, it might be useful for the hollow beads to be endowed structurally with a stability such that they do not inherently burst under flight conditions, with the associated low ambient pressure at high altitudes, as a result of the overpressure within the hollow beads.

In one advantageous embodiment the inert gas is nitrogen. This gas is harmless, easy to work with and available inexpensively in large quantities.

The hollow beads comprise, more preferably, a brittle material. The material, consequently, has only little capacity for plastic deformation and exhibits a comparatively high hardness. As well as ceramics, carbides and nitrides, glass is suitable as well. By using a brittle material, it is possible to force the bursting of the hollow beads in the event of a lightning strike. At the same time, in their undamaged condition, the hollow beads are secure enough not to influence the mechanical properties of the coating.

The brittle material may, with particular advantage, comprise glass. Glass is a material having very good handling qualities, which is processable and available in countless variants. The production of hollow beads of very low diameter is possible on a large scale: it uses, for example, a high-temperature heat transfer process around finely ground glass particles. This process can be carried out under a nitrogen atmosphere, and so the hollow beads are filled with the nitrogen.

The hollow beads could have a diameter of 10-100 μm. This allows them to be admixed effectively to the color of the base color substance without having any disruptive influence on the processing of the coating material.

The coating could comprise a metallic material or a carbon allotrope. The metallic material could be applied by vapor deposition. Carbon allotropes, examples being carbon fibers, carbon nanotubes, graphene or the like, could adhere to the hollow beads.

The invention further relates to a method for coating a lightning-prone object, comprising applying a coating material with a base color substance admixed with an additive, wherein the additive comprises rigid hollow beads filled with an inert gas, and wherein at least a portion of the hollow beads have an electrically conductive coating.

In one advantageous embodiment, the method further comprises preparing the coating material by provision of the base color substance and admixing the additive. The admixing may be accomplished by metering the additive and combining the base color substance with the additive, in which case stirring should take place as mechanically gently as possible, in order not to damage the hollow beads during the combining The applying is preferably accomplished by spraying. Accordingly the applying is no different from customary application methods, and the tools customary for this purpose can continue to be utilized.

The invention additionally relates to a coated object comprising at least one outer surface coated with a coating material according to the preceding description.

The object could be a vehicle, more particularly an aircraft. However, other kinds of vehicles are also conceivable, and the invention is not confined solely to utilization on aircraft.

The object could also be a stationary object. Appropriate here might be, for instance, architectural facing structures, roof structures or components, for example rotor blades, of wind turbines, coated with a coating material of the invention. Applied beneath the coating material might be a primer.

The use of the coating material of the invention is appropriate especially for objects having a structure produced at least partly from a fiber composite material, for example CRP or GRP.

BRIEF DESCRIPTION OF THE DRAWINGS

Additional features, advantages and possible applications of the present invention are apparent from the description below of the exemplary embodiments and the figures. In this description, all of the features described and/or depicted, by themselves and in any desired combination, form the subject material of the invention, independently also of their composition in the individual claims or dependency references therein. In the figures, moreover, reference symbols which are the same represent identical or similar objects.

DETAILED DESCRIPTION OF THE PREFERRED EMBODIMENTS

Figure 1:
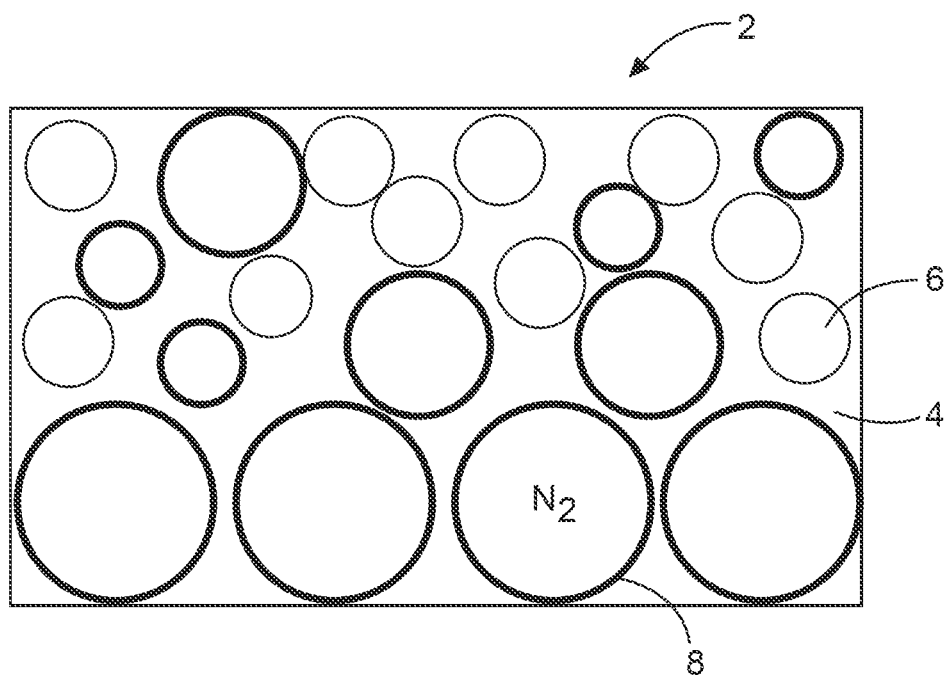
FIG. 1 shows a sectional representation of a coating material.

FIG. 1 shows a coating material 2 in a schematic sectional representation.

The coating material 2 comprises a base color substance 4, which might correspond to a paint customary for the object in question. Admixed with the base color substance 4 is an additive in the form of hollow beads 6 composed of a rigid material. The hollow beads 6 are each filled with an inert gas which comprises, for example, nitrogen (N2).

At least a portion of the hollow beads 6 have an electrically conductive coating 8. This might, for example, be produced by vapor deposition with a metallic material. The hollow beads 6 have a diameter which is situated in a range of 10-100 μm and so substantially does not affect the mechanical properties of the base color substance 4. The diameter of the hollow beads 6 ought at most to correspond to a desired thickness of a coating applied to the object.

When lightning strikes a coating with the coating material 2, a current flow is initiated in the electrically conductive coating 8 and causes heating of the hollow beads 6 and bursting. It is preferable here for the hollow beads 6 to comprise a brittle material, for example glass. The nitrogen might be stored in the hollow beads 6 with an overpressure. On bursting, the nitrogen is released suddenly and is able to counteract the formation of a plasma channel caused by the lightning, so as to protect a coated structure.

Figure 2:
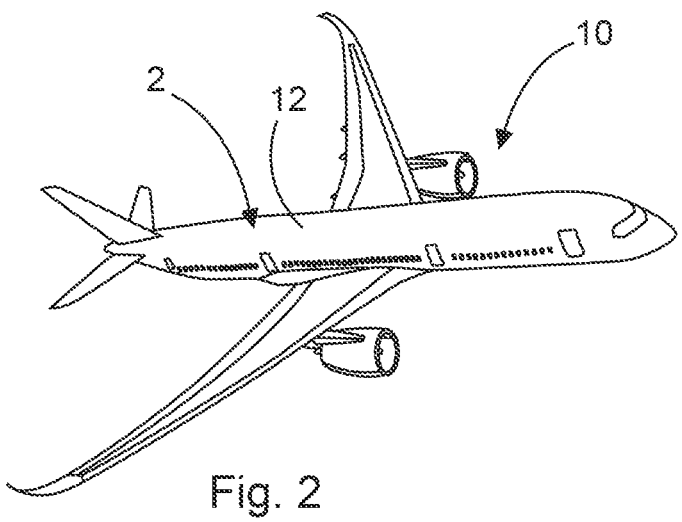
FIG. 2 shows a coated object in the form of an aircraft.
Figure 3:
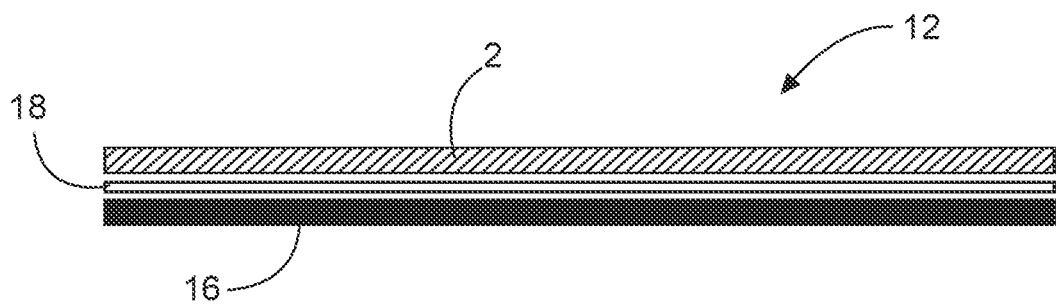
FIG. 3 shows a sectional representation of a coating of an object.

FIG. 2 shows a coated object in the form of an aircraft 10 which has an outer surface 12 on which the coating material 2 is disposed. In this way it might be possible to realize a coating 14 which is represented in FIG. 3. The coating 14 might be disposed on an outer skin 16 of the aircraft 10, said skin bearing a primer 18. The outer skin 16, which corresponds to part of a structure of the aircraft 10, may comprise a metallic material or of a fiber composite material.

For completion it may be pointed out that "comprising" or "having" does not rule out any other elements or steps, and that "a", "an" or "one" does not rule out a multiplicity. It may be pointed out, furthermore, that features described with reference to one of the exemplary embodiments above can also be used in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 2 coating material
4 base color substance
6 hollow bead
8 electrically conductive coating
10 aircraft
12 outer surface
14 coating (of the object)
16 outer skin/structure
18 primer

The invention claimed is:

1. An aircraft comprising at least one outer surface coated with a coating material for a lightning-prone object, the coating material comprising:
   a base color substance, and
   an additive admixed with the base color substance,
   wherein the additive comprises rigid hollow beads which contain a volume of an inert gas that exceeds an internal volume of the rigid hollow beads, such that particles of the inert gas apply a pressure above the ambient pressure to the rigid hollow beads, and
   wherein at least a portion of the hollow beads have an electrically conductive coating on an exterior surface of the hollow beads.

2. The aircraft according to claim 1, wherein the inert gas is nitrogen.

3. The aircraft according to claim 1, wherein the hollow beads comprise a brittle material.

4. The aircraft according to claim 3, wherein the brittle material comprises glass.

5. The aircraft according to claim 1, wherein the hollow beads have a diameter of 10 to 100 μm.

6. The aircraft according to claim 1, wherein the electrically conductive coating comprises a metallic material or a carbon allotrope.

7. The aircraft according to claim 1, wherein the coated object is a stationary object.

8. The aircraft according to claim 1, wherein the coated object comprises a structure produced at least partly from a fiber composite material.

9. The aircraft according to claim 1, wherein the rigid hollow beads have diameters of varying size.

10. The aircraft according to claim 1, wherein the rigid hollow beads are designed to burst in the event of electrical exposure.

11. A method for coating a lightning-prone object, comprising:
    applying a coating material which includes a base color substance admixed with an additive to the lightning-prone object, wherein the applying is accomplished by spraying,
    wherein the additive comprises rigid hollow beads filled with an inert gas which is stored in the rigid hollow beads with an overpressure, and
    wherein at least a portion of the hollow beads have an electrically conductive coating on an exterior surface of the hollow beads.

12. The method according to claim 11, further comprising preparing the coating material by providing the base color substance and admixing the additive.

13. The method according to claim 11, wherein the rigid hollow beads have diameters of varying size.

14. The method according to claim 11,
    wherein the rigid hollow beads are designed to burst in the event of electrical exposure.

15. An aircraft comprising at least one outer surface coated with a dual coating for a lightning-prone object, the dual coating comprising:
    a coating material including:
        a base color substance, and
        an additive admixed with the base color substance, and
    a clearcoat which covers the coating material,
    wherein the additive comprises rigid hollow beads which contain a volume of an inert gas that exceeds an internal volume of the rigid hollow beads, such that particles of the inert gas apply a pressure above the ambient pressure to the rigid hollow beads, and
    wherein at least a portion of the hollow beads have an electrically conductive coating on an exterior surface of the hollow beads.

\* \* \* \* \*